June 29, 1948.   J. D. CAMPBELL   2,444,245
TENSION MEASURING DEVICE
Filed May 1, 1946   3 Sheets-Sheet 2

Inventor:
James D. Campbell,
by *Claude A. Watt*
His Attorney.

Patented June 29, 1948

2,444,245

UNITED STATES PATENT OFFICE 2,444,245

TENSION MEASURING DEVICE

James D. Campbell, Schenectady, N. Y., assignor to General Electric Company, a corporation of New York Application May 1, 1946, Serial No. 666,482

6 Claims. (Cl. 73—144)

This invention relates to devices for measuring tension; more particularly to devices for measuring tension in a length of material extending between two work performing devices, and it has for an object the provision of a simple, reliable, and inexpensive device of this character.

Still more specifically the invention relates to devices for use in combination with loopers for the measurement of tension in a strip of material which is passing over the looper.

In carrying the invention into effect in one form thereof, a looper is provided which has a roller that is carried on a pivoted supporting arm and is disposed to bear against a strip of material which extends between two work performing devices. Means are provided for applying a force to rotate the arm through an angle to deflect the strip from the line between the two work devices. Means are provided for producing a voltage proportional to the sine of the angle through which the arm is rotated and a second voltage which is proportional to the force of the roller against the strip. The ratio of these two voltages which is proportional to the tension of the strip is measured by means of an electrical ratio meter which is calibrated in units of tension.

In illustrating the invention in one form thereof it is shown as applied to the measurement of tension in a steel strip which is being passed through a rolling mill.

Figure 1:
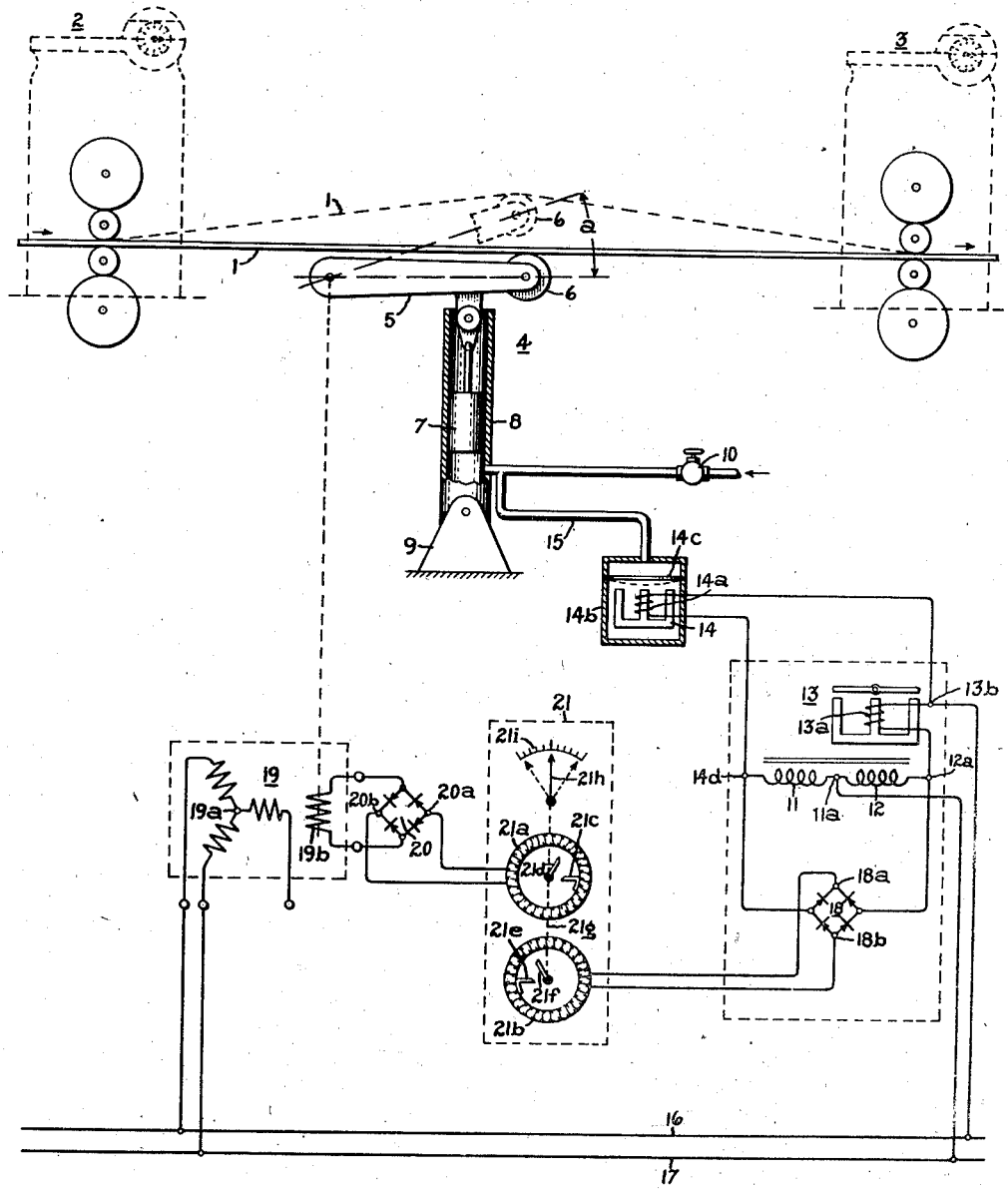
Figure 2:
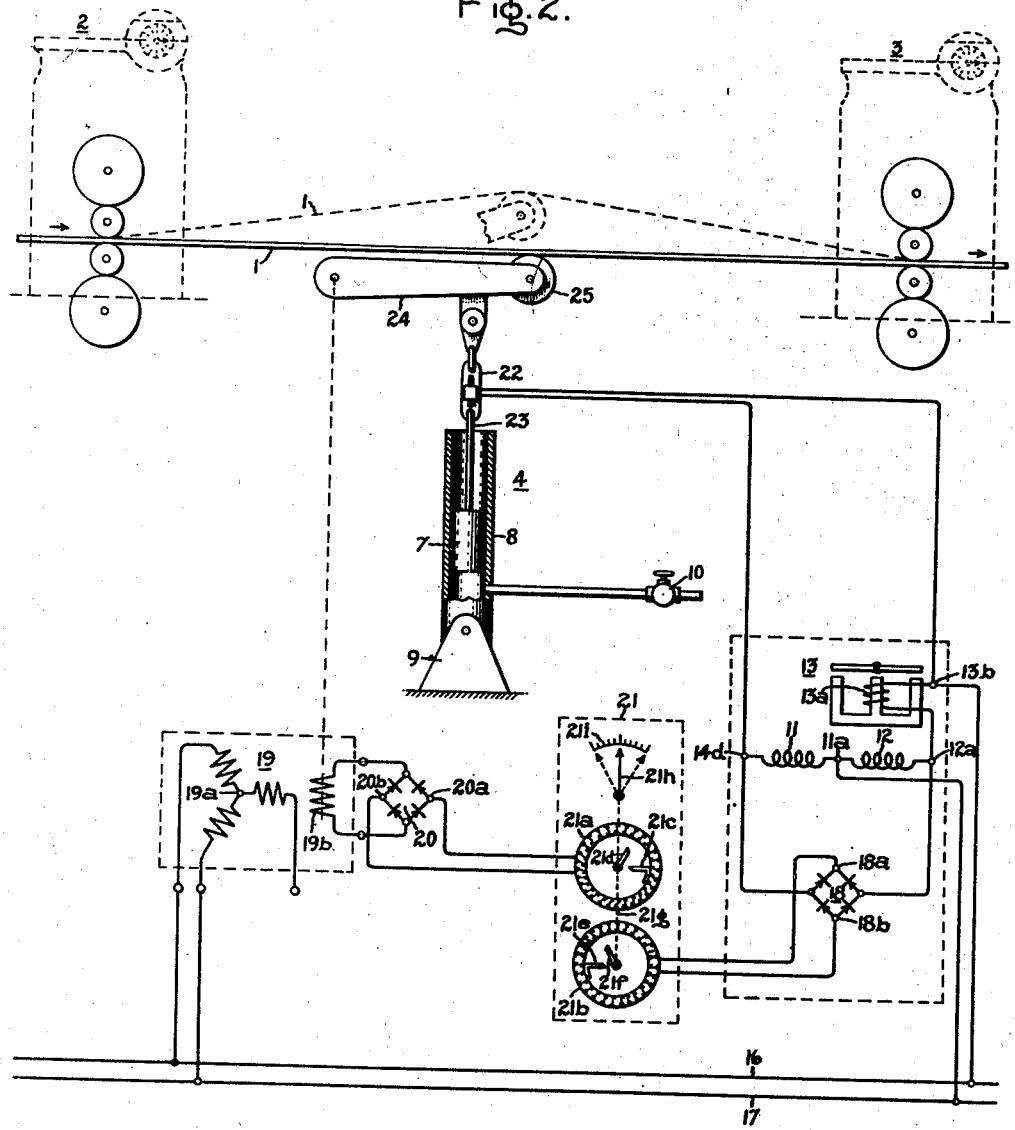
Figure 3:
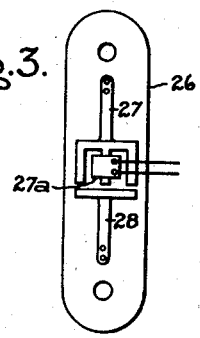
Figure 4:
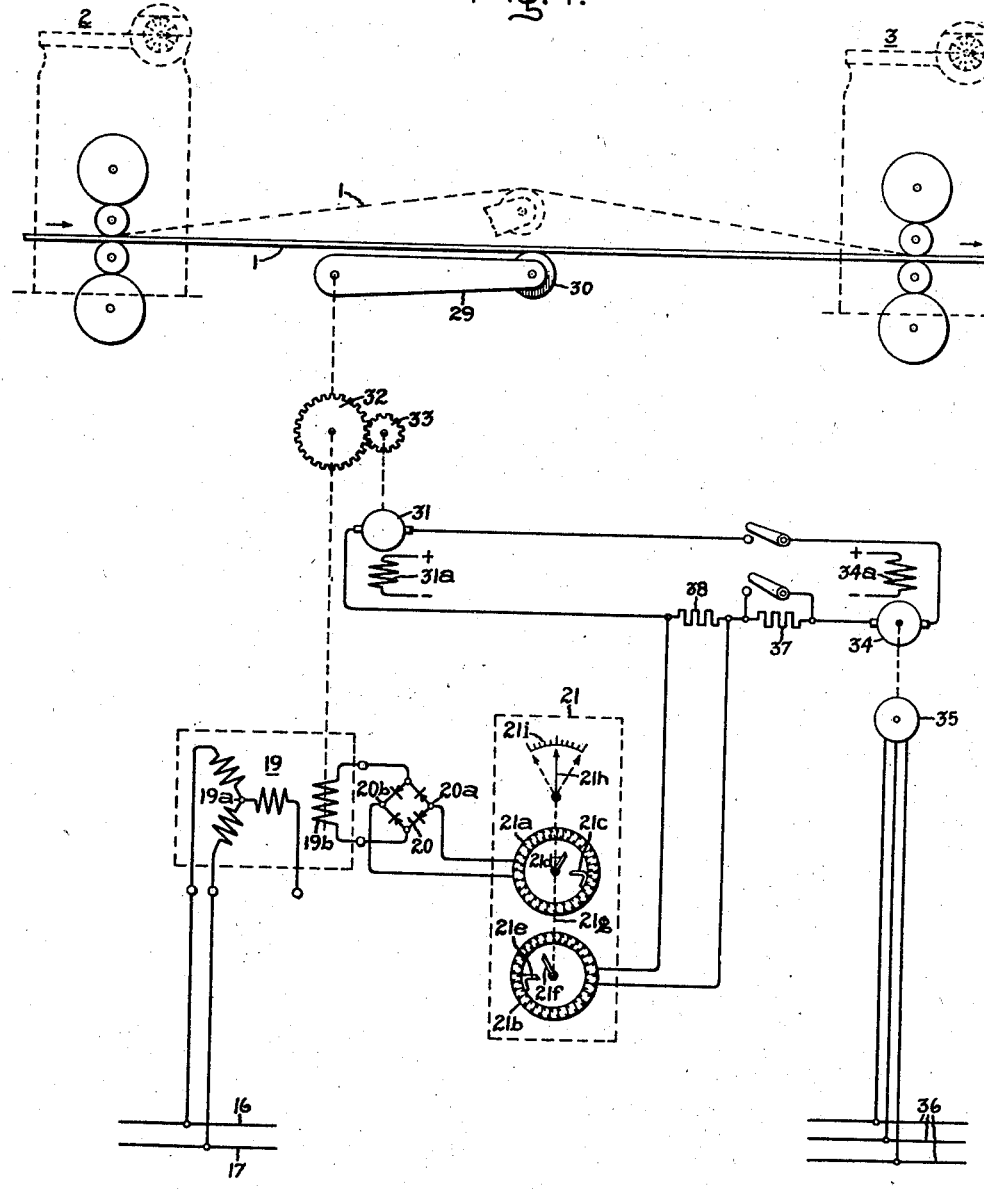

For a better and more complete understanding of the invention, reference should now be had to the following specification and to the accompanying drawings of which Fig. 1 is a simple, diagrammatic sketch of an embodiment of the invention, Figs. 2 and 4, are simple, diagrammatic sketches of modifications, and Fig. 3 is a sketch of a detail.

Referring now to the drawing, a length of material 1, such as a strip of steel, is being passed in the direction of the arrows through successive stands 2 and 3 of a rolling mill. Situated between the two stands is a looper 4. Loopers are in general use between the finishing stands of all mills. The looper shown in Fig. 1 comprises a double arm 5 which carries an idler roller 6 at its outer or "down mill" end. The arm is pivotally mounted slightly below the level of the mill table and arranged so that it may be tilted up under the strip so as to take up any slack that may occur between successive stands owing to inexact proportioning of mill drafts and speeds of the successive stands. The roller 6 is raised above the normal pass line by means of a piston 7 which is slidably mounted within the cylinder 8. As shown, the cylinder is pivotally mounted on uprights 9 to provide for slight variations of the connecting rod from a vertical position. To raise the looper roll, the valve 10 is opened by the operator to admit air to the cylinder from a suitable source (not shown) of compressed air. A suitable stop may be provided to limit the angle through which the arm is rotated. To lower the roll, the valve 10 is closed and the cylinder is vented to atmosphere.

As used heretofore, the purpose of the looper was to remove slack from the strip. The presence of slack in a hot strip is dangerous because the strip may fold over to a triple thickness and go through the rolls. Such an occurrence may break the mill rolls, or cause the motor driving that stand to be greatly overloaded.

It is desirable to measure and indicate the tension in the strip without interfering with the normal functioning of the looper to take up slack in the strip. It is therefore an important object of this invention to make use of the looper for its normal function of slack control and to combine with it additional apparatus and indicating devices for obtaining a measurement of tension in the strip. It is desirable that the apparatus and devices to be combined with the looper shall be of such character that they may be used upon loopers already installed and in service.

With the rolls 6 raised above the pass line and the strip 1 deflected from the pass line to the positions illustrated in dotted lines, the tension in the strip is directly proportional to the downward force on the tension roll and inversely proportional to the height of the roll above the normal pass line for the distance usually used, i. e.

$$T = k_1 \frac{P}{H}$$

in which

T = tension in strip
P = downward force on roller
H = vertical distance of roller above normal pass line
$k_1$ a constant of which the value is dependent on the geometric horizontal position of the looper roll with respect to the mill rolls.

Since H is proportional to sine $a$ in which $a$ is the angle of rotation of the arm 5 from its normal position, $$T = k_2 \frac{P}{\text{sine } a}$$

in which $k_2$ = a constant determined by $k_1$ and the effective length of the looper arm.

In order to measure and indicate the tension T, means are provided for producing two voltages of which one is proportional to the downward force on the roll and the other is proportional to sine $a$.

The means for producing the voltage proportional to the downward force on the roller comprises a reactance bridge circuit of which the reactance coils 11 and 12 constitute the ratio arms, the reactance coil 13a of the fixed air gap reactor constitutes the third arm and the coil 14a of the variable air gap reactor 14 constitutes the balance arm or fourth arm. The reactor 14 is mounted in a sealed casing 14b and is provided with a diaphragm 14c of magnetic material. A conduit 15 provides communication between the space beneath the piston in cylinder 8 and the interior of the casing 14b. Consequently the pressure exerted against the lower face of the piston is also exerted against the upper face of the diaphragm and deflects it from its normal horizontal position by an amount proportional to the pressure as indicated by the dotted line. When the roller 6 is at rest in any position, the downward pressure of the strip against the roller is equal to the upward pressure of the roller against the strip—which is proportional to the pressure exerted against the lower face of the piston.

An alternating voltage is supplied from a suitable source, which is represented by the supply lines 16 and 17, to the input terminals 11a and 13b of the bridge. When the diaphragm is in its normal unstressed position the reactance of the reactor 14 is of such value that the bridge is balanced and zero voltage appears across the output terminals 12a and 14d.

A deflection of the diaphragm 14c from its normal unstressed position varies the reluctance of the magnetic circuit of the reactor and thereby varies the reactance of its winding 14a. This unbalances the bridge and causes an alternating voltage to appear across the output terminals which is proportional to the unbalance and is therefore proportional to the vertical pressure on the tension roller. This alternating voltage is rectified by suitable means such as the biphase full wave rectifier 18. The rectified voltage which is also proportional to the downward pressure on the tension roller appears across the output terminals 18a and 18b of the rectifier.

The means for producing a voltage proportional to the sine of angle $a$ comprises a rotary induction device 19 such as the device known as a selsyn. This device has a stator member (not shown) upon which is wound a three element distributed winding 19a which is physically similar to the three phase winding of a wound rotor induction motor, and a rotor member (not shown) upon which is mounted a single element winding 19b in inductive relationship with the three element winding. Two of the winding elements 19a are supplied from the single phase alternating voltage source 16, 17.

When the angle between the longitudinal axis of the single element winding 19b and the axis of the magnetic field produced by the winding 19a is 90 degrees, zero voltage is induced in the winding 19b. As the winding 19b is rotated from this 90 degree position, a voltage is induced in it which is proportional to the sine of the angle through which it is rotated. The rotor member which mounts the winding 19b is mechanically connected to the arm 5 of the looper so as to rotate therewith through an angle which is equal or proportional to the angle $a$ through which the arm rotates. Thus, the voltage induced in the winding 19b is proportional to the sine of the angle $a$. This voltage is rectified by means of a biphase full wave rectifier 20. The rectified voltage which is also proportional to the sine of the angle $a$ appears across the output terminals 20a and 20b of the rectifier.

This voltage is supplied to a stationary coil 21a of an electric ratio meter 21. Similarly, the voltage which is proportional to the downward pressure on the tension roller is supplied to a second stationary winding 21b of the ratio meter. Preferably, the ratio meter is a magnetic vane repulsion type of instrument. As shown this instrument has a stationary magnetic vane 21c which extends longitudinally of the coil 21a and a movable vane 21d which also extends longitudinally of the coil. Both vanes are magnetized by the flux of the coil. The ends of the vanes which are seen in the drawing have the same polarity, and the opposite ends have the opposite polarity. Thus, when the coil is energized and the vanes are magnetized the vanes repel each other, which causes the movable vane to move.

Similarly, the coil 21b has a stationary vane 21e and a movable vane 21f. The two movable vanes 21d and 21f are mounted on a common shaft 21g. At its upper end the shaft carries a needle 21h which moves over a graduated scale 21i. The instrument has no springs and thus the movable vanes are unbiased.

When both coils are energized the movable vanes assume positions with respect to their cooperating stationary vanes such that the deflection of the needle 21h from one of its end limiting positions is proportional to the ratio of the fluxes of the two coils 21a and 21b and therefore proportional to the ratio of the downward pressure on the tension roller and the sine of the angle $a$, i. e., its deflection is proportional to $$\frac{P}{\sin a}$$

Since the tension in the strip is also proportional to $$\frac{P}{\sin a}$$

the scale 21i of the meter may be calibrated in terms of pounds tension in the strip.

The apparatus in the modification of Fig. 2 is identical with the apparatus of Fig. 1 with the exception that the diaphragm type pressure responsive reactor 14 of Fig. 1 is replaced by a strain gage 22 which is connected between one end of the piston connecting rod 23 and the looper arm 24 which carries the tension roller 25. An enlargement of the strain gage is shown in Fig. 3. It comprises a piece of metal 26 of suitable dimensions, which is placed under compression by the force exerted by the piston. Within its elastic limit it is shortened in proportion to such compression. Fastened near the opposite ends of the compression member are parts 27 and 28 of the magnetic core of a variable reactor. A coil 27a is wound on the central leg of the core part 27. It is connected as one leg of a bridge which is identical with the bridge of Fig. 1.

The gap between the two core parts is decreased as the compression of the member 22 is increased. This varies the air gap and the reluctance of the magnetic circuit, thereby varying the reactance of the coil 27a and unbalancing the bridge circuit just as deflection of the diaphragm 14c of Fig. 1 unbalances the bridge circuit. Since the remainder of the apparatus is identical with corresponding apparatus in Fig. 1 described in the foregoing, a repetition is omitted.

In the modification of Fig. 4, the arm 29 of the looper, which carries the tension roller 30, is rotated about its pivot by means of an electric torque motor 31, to the drive shaft of which the arm 29 is connected through reduction gearing 32 and 33. The armature of the motor 31 is connected in a loop circuit with the armature of an adjustable voltage generator 34. This generator is driven at a speed which is substantially constant by suitable means, such as the induction motor 35, which is supplied from a suitable source, such as represented by the three supply lines 36. The motor 31 and generator 34 are provided with field windings 31a and 34a respectively which are supplied from a suitable source as indicated in the drawing.

A torque motor is essentially the same as a conventional motor, but it is designed to have sufficient ventilation to enable it to be operated under stalled condition without damage to its winding. Thus, in operation the motor 31 rotates the arm 29 until its torque is balanced by the downward pressure of the strip against the tension roller. The motor stalls but exerts a continuous torque on the arm 29. A resistor 37 is included in the armature circuit of the motor. It limits the current to a safe value.

It is assumed that the excitation of the field winding of the torque motor is constant. Consequently the torque of the motor is proportional to the armature current.

A voltage proportional to the armature current is obtained from a voltage drop resistor 38 which is included in the armature circuit. Since the armature current is proportional to torque of the motor and the downward pressure of the strip on the tension roller 30, the voltage drop across the resistor 37 is also proportional to the downward pressure of the strip on the pressure roller. This voltage is supplied to one of the coils of the ratio meter just as the voltage from the bridge is supplied to the coil 21b of the ratio meter of Fig. 1.

The remainder of the apparatus is identical with corresponding elements of Fig. 1, and a repetition of the description of these elements and their operation is omitted.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A combined looper and tensiometer for measuring tension in a strip of material extending between two adjacent work performing devices, comprising a tensioning roller disposed to bear against the strip, a pivoted arm supporting said roller, means for applying a force to said arm to rotate said arm through an angle to deflect the strip from the line between said work devices, means responsive to said rotation for producing a voltage proportional to the sine of said angle, means responsive to said force for producing a voltage proportional to said force, and an electrical ratio meter for measuring the ratio of said voltages.

2. A combined looper and tensiometer for measuring the tension in a strip of material extending between two adjacent work performing devices comprising a tensioning roller disposed to bear against the strip, a pivoted arm supporting said roller, means for applying a force to said arm to rotate said arm through an angle to deflect the strip from the line between said work devices comprising a cylinder, a piston in said cylinder connected to said arm and means for supplying pressure fluid to said cylinder, means responsive to said rotation for producing a voltage proportional to the sine of said angle, means responsive to said force for producing a voltage proportional to said force comprising an electrical pressure gauge responsive to the pressure in said cylinder, and an electrical ratio meter for measuring the ratio of said voltages.

3. A combined looper and tensiometer for measuring the tension in a strip of material extending between two work performing devices comprising a tensioning roller disposed to bear against the strip, a pivoted arm supporting said roller, means for applying a force to said arm to rotate said arm through an angle to deflect the strip from the line between said work devices, means responsive to said rotation for producing a voltage proportional to the sine of said angle comprising a rotary induction device having primary and secondary winding elements and a mechanical connection between one of said elements and said arm for effecting relative movement of said elements in response to rotation of said arm, means responsive to said force for producing a voltage proportional to said force, and an electrical ratio meter for measuring the ratio of said voltages.

4. A combined looper and tensiometer for measuring tension in a strip of material extending between two adjacent work performing devices, comprising a tensioning roller disposed to bear against the strip, a pivoted arm supporting said roller, means for applying a force to said arm to rotate said arm through an angle to deflect the strip from the line between said work devices, means responsive to said rotation for producing a voltage proportional to the sine of said angle, means responsive to said force for producing a voltage proportional to said force comprising a Wheatstone bridge, a variable gap reactance device having a winding connected as an arm of said bridge and diaphragm responsive to the pressure of said pressure fluid for varying the reactance of said winding.

5. A combined looper and tensiometer for measuring tension in a strip of material extending between two adjacent work performing devices, comprising a tensioning roller disposed to bear against the strip, a pivoted arm supporting said roller, means for applying a force to said arm to rotate said arm through an angle to deflect the strip from the line between said work devices, means responsive to said rotation for producing a voltage proportional to the sine of said angle, means responsive to said force for producing a voltage proportional to said force comprising a strain gauge responsive to said force, and an electrical ratio meter for measuring the ratio of said voltages.

6. A combined looper and tensiometer for measuring the tension in a strip of material extending between two work performing devices comprising a tensioning roller disposed to bear against the strip, a pivoted arm supporting said roller, an electric torque motor for rotating said arm through an angle to deflect the strip from the line between said work devices, means responsive to said rotation for producing a voltage proportional to the sine of said angle, means responsive to the armature current of said motor for producing a voltage proportional to the force of said roller against the strip, and an electrical ratio meter for measuring the ratio of said voltages.

JAMES D. CAMPBELL.

REFERENCES CITED

The following references are of record in the file of this patent:

UNITED STATES PATENTS

| Number | Name | Date |
|---|---|---|
| 2,323,818 | Lessmann | July 6, 1943 |
| 2,340,067 | Lessmann | Jan. 25, 1944 |
| 2,343,229 | Stone | Feb. 29, 1944 |
| 2,353,249 | Lebourg | July 11, 1944 |
| 2,426,390 | De Forest | Aug. 26, 1947 |